O. H. ESCHHOLZ.
ARC WELDING SYSTEM.
APPLICATION FILED SEPT. 8, 1919.

1,343,199.

Patented June 15, 1920.

WITNESSES:

INVENTOR
Otto. H. Eschholz.
BY
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ARC-WELDING SYSTEM.

1,343,199.

Specification of Letters Patent. Patented June 15, 1920.

Application filed September 8, 1919. Serial No. 322,281.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Arc-Welding Systems, of which the following is a specification.

My invention relates to arc welding systems and, more particularly, to welding systems employing alternating current. The primary object of my invention is to provide an electric-arc welding system employing alternating current which shall insure relatively easy starting characteristics.

I have found, by extensive tests, that the main disadvantages which have prohibited, to a certain extent, the general employment of alternating current in electric-arc welding systems are occasioned by the difficulties experienced in drawing an arc and the undesirable features accompanying the employment of a relatively high voltage to overcome the starting difficulties. The establishing of an arc by means of alternating current may be facilitated by employing relatively high voltages, but the employment of a voltage of the necessary value introduces a shock hazard.

One object of my invention, therefore, resides in the provision of a welding system in which the starting characteristics may be improved without introducing undesirable high-voltage conditions when welding is not being performed.

A still further object of my invention is to improve the starting characteristics of an alternating-current welding system in such manner as to obviate the necessity of special attention of the operator in order for it to function in a satisfactory manner.

I have found that, by employing a relatively high voltage, an arc may be established with greater ease than when a lower voltage is employed in an alternating-current welding system. The ease with which the arc is started may be further facilitated by increasing the current value during the period of establishing the arc. However, it is desirable that low open-circuit-voltage conditions be established in order to fully protect the operator from any hazardous conditions. I have found that the advantageous features of a relatively high starting voltage and a relatively heavy current may be obtained in a welding system by employing automatic switching means for varying the number of turns included in the primary circuit of a transformer incorporated in a welding system.

Figure 1:
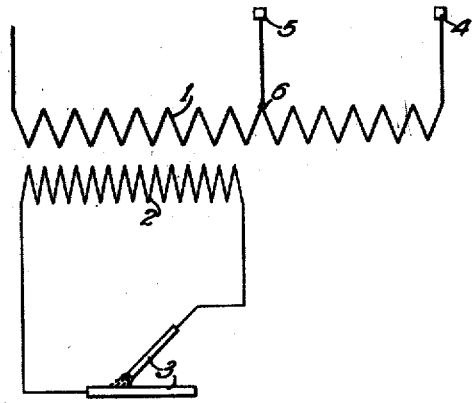
Figure 2:
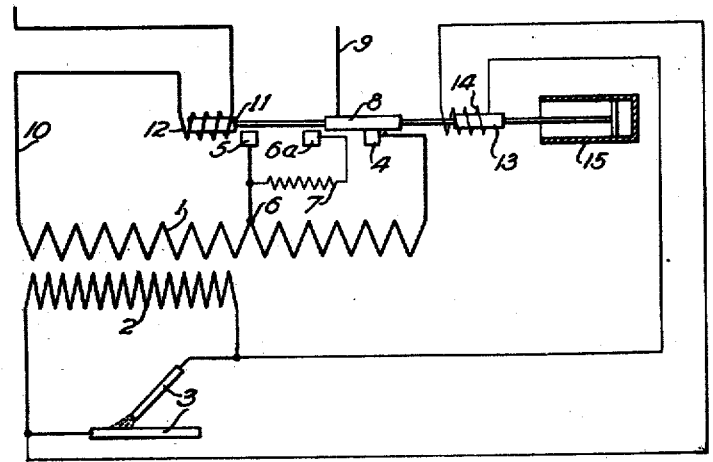
Figure 3:
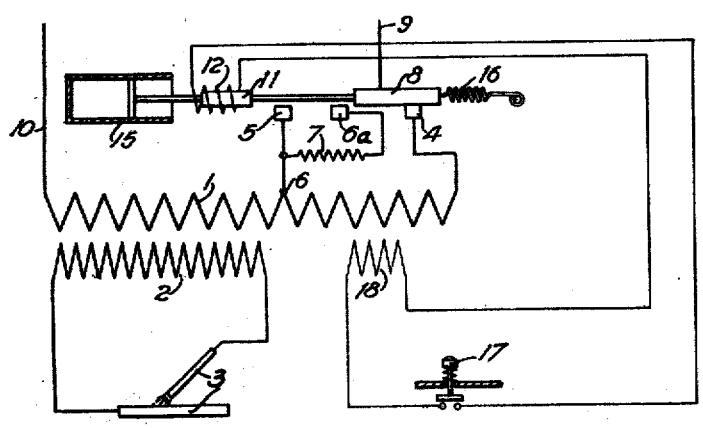

In the drawings, Figure 1 is a simplified diagrammatic view of a welding system which may be employed in accordance with my invention; Fig. 2 is a diagrammatic view showing an application of my invention, and Fig. 3 is a similar view illustrating a modification of my invention.

In practising my invention, various forms of switching means may be employed to vary the number of turns included in the primary circuit of an arc welding transformer in order to obtain a relatively high starting voltage and a relatively heavy current, both of which may be subsequently reduced to a desirable operating value. For example, a transformer may be employed having primary and secondary windings, the secondary winding of which may be directly connected to a plurality of electrodes or to an electrode and to the work. One end of the primary winding may be connected to a supply circuit and the said winding may be provided with a tap, which may be connected to the supply circuit to include the total number of turns thereof and with another tap which may be connected to the supply circuit to include a portion only of its turns.

In order to obtain a relatively high voltage between the electrodes, under starting conditions, the primary winding may be connected to a supply circuit by employing one of the taps which includes only a portion of the winding, whereby the voltage per turn in the winding may be materially increased. When an arc has been established between the electrodes, the connections of the primary winding may be automatically changed to include the total winding and to thus reduce the voltage per turn therein. By thus varying the connections of the primary winding, a relatively high voltage, which is also supplemented by a relatively heavy current, may be employed to facilitate establishing an arc, and the voltage and current may be subsequently reduced to desirable operating values, which also obtain under open-circuit conditions and protect the operator at all times.

In Fig. 1 is shown a simplified view of an arc welding system comprising a primary winding 1 and a secondary winding 2, the latter of which may be connected to a plurality of electrodes 3. The primary winding 1 may be provided with means for connecting one end thereof to a supply circuit (not shown) and the other end may be connected to a stationary contact-member 4. Another stationary contact-member 5 may be connected to one of the turns of the primary winding, as indicated at 6.

The above described welding system shows, in a simplified way, the manner in which a relatively high starting voltage and a subsequently lower operating voltage may be obtained. For example, under starting conditions, the primary winding 1 may be connected to a supply circuit by connecting one end thereof to the circuit and by connecting the stationary contact member 5 to the supply circuit, thereby including only a portion of the winding 1. The voltage per turn in the primary winding may thus be raised, and, consequently, a higher voltage be obtained across the electrodes 3 in the secondary circuit. After an arc has been established between the electrodes 3, the connection to the tap 5 may be changed to the tap 4 to include the total number of turns in the primary winding 1 and thus reduce the voltage per turn therein, and, consequently, the operating voltage existing across the electrodes.

In Fig. 2 is shown a welding system in which a practical means for utilizing my invention is illustrated. As here shown, the primary winding 1 is provided with an auxiliary tap or stationary contact member 6ₐ which is connected, through a resistor 7, to the contact member 5. The purpose of this auxilary contact member will be more fully understood from the following description: A movable contact member 8 may be employed which may be provided with a flexible lead 9 for connecting it to a supply circuit, one end of the winding 1 being connected, at all times, to a supply circuit by a lead 10. The member 8 may be mechanically connected to a core member 11 which is adapted to be actuated by a coil 12 to be connected in the primary circuit, as indicated in the drawings. The member 8 may also be connected to another core member 13 which is adapted to be actuated by a coil 14 to be connected in parallel relation to the electrodes 3. A retarding device may be employed by connecting the core member 13 to the moving element of a dash pot 15.

The above described welding system embodies the same general principles as the simplified system shown in Fig. 1. To perform a welding operation, the primary winding 1 may be energized by connecting it to a supply circuit (not shown), through leads 9 and 10. When the primary winding 1 is thus connected to a supply circuit and open-circuit conditions obtain in the secondary circuit, only a magnetizing current flows in the primary winding 1, and the coil 12 is not sufficiently energized to move the contact member 8 into engagement with the stationary member 5. However, when the electrodes are engaged, preliminarily to establishing an arc, the coil 12 is sufficiently energized to actuate the core member 11 and move the contact member 8 into engagement with the stationary member 5, thus increasing the voltage per turn in the primary winding 1 and, consequently, the voltage available across the electrodes 3. When the electrodes 3 are in engagement, the coil 14 is practically deënergized and permits of the movement of the member 8 to engage the member 5, but, when the electrodes are separated to establish an arc, the coil 14 is energized to overcome the action of the coil 12 and move the member 8 back into engagement with the stationary member 4, thus inserting the total number of turns of the primary winding 1 in the primary circuit and reducing the voltage per turn therein. The voltage across the electrodes is thus reduced, when an arc has been established, to a suitable operating value. If the arc should be broken or interrupted for any reason, the operating voltage available between the electrodes still obtains under the open-circuit conditions because the coil 12 is only sufficiently energized to move the contact member 8 into engagement with the member 5 when the electrodes are engaged or short-circuited.

It will be understood, from the above description, that the contact member 6ₐ is employed to prevent the opening of the primary circuit when the movable contact-member 8 is moved from the member 4 to the member 5 or vice versa. The resistor 7 may be employed to prevent short-circuiting of the turns of the winding 1 included between the members 4 and 5. Furthermore, the stationary contact member 6ₐ reduces sparking between the contact-members when they are moved into and out of engagement with each other. The retarding device 15 may be omitted, if desired, but it may be found advantageous, under some circumstances, to retard the reduction of the initial high starting voltage to a subsequent low operating voltage to give the operator more time to establish an arc while the high voltage is available. It will be appreciated that other retarding-means may be employed than the dash pot, such, for example, as a spring which may be subjected to compression when the movable contact-member is moved into engagement with the member 4.

Various arrangements may be employed to obtain the advantageous features above set forth and my invention contemplates the employment of all such combinations and, in order to illustrate the adaptability of my invention, to other forms of circuits, I have shown a modification of my invention in Fig. 3. As here shown, a spring 16 may be connected to the movable contact-member 8 which tends to maintain it always in engagement with the stationary contact-member 4. The spring 16 replaces the core member 13 and its actuating coil 14, shown in Fig. 2. The coil 12 may be connected through a manually-operable switch 17, such as a push button switch, to another coil 18, inductively related to the primary winding 1. The only difference in the welding system shown in Fig. 3 from that shown in Fig. 2, is the connection of the coil 12 to a coil which is energized by the inductive action between the primary winding 1 and the coil 18, the inclusion of a manually-operable switch and the employment of means which tends to always maintain the movable contact member 8 in engagement with the stationary contact member 4 which includes the total number of turns of the primary winding 1.

The above described welding system may be operated by connecting the primary winding 1 to a supply circuit by means of the leads 9 and 10. When the winding 1 is thus connected in a supply circuit, the total number of turns thereof are included and, when it is desired to establish an arc between the electrodes 3, the push button 17 may be operated to close the circuit between the coils 18 and 12. The coil 12 is thus energized and the core member 11 is actuated, causing the movable contact-member 8 to be moved into engagement with the stationary member 5, thus including only a portion of the primary winding and increasing the voltage available across the electrodes 3. The push button may be held to close the circuit until an arc is established between the electrodes, after which it may be released, thus causing the coil 12 to be de-energized and allowing the spring 16 to move the contact-member 8 back into engagement with the stationary member 4. The voltage available across the electrodes is, therefore, reduced, and, if the arc should become broken and open-circuit conditions established, the low operating voltage would still obtain in the secondary circuit.

The push button 17, or other suitable switching-means, may be disposed in the electrode holder ordinarily employed by the operator in order to facilitate the ease of operation of the system. The employment of the manually-operable switch insures thorough protection of the operator against high-voltage conditions because he is always aware of the fact when a high voltage is available across the electrodes.

It will be appreciated from the foregoing description of the welding systems, that my invention is susceptible of minor changes to obtain relatively easy starting characteristics in an alternating-current welding system. My invention contemplates broadly, the employment of a relatively high starting voltage supplemented by a relatively heavy current, both of which are subsequently reduced to a lower desirable operating value and, also, low-voltage conditions when the welding system is not in operation. I have shown that these advantageous features may be obtained by means which are entirely automatic and not subject to the attention of the operator or that the same result may be obtained by means which are entirely under the operator's control. In any event, the same result in good starting characteristics is accomplished in substantially the same manner.

Although I have shown and specifically described a plurality of welding systems which embody my invention, it is obvious that minor changes may be made in the elements employed and in their disposition in the systems without departing from the spirit or scope of my invention, and I desire, therefore, that no limitations shall be imposed except such as are indicated in the appended claims.

I claim as my invention:—

1. An electric-arc welding system comprising a transformer having primary and secondary windings, a plurality of electrodes connected to the secondary winding, means for connecting the primary winding to a source of alternating-current, and means for changing the primary connections to vary the number of turns of the winding included in the primary circuit.

2. An electric-arc welding system comprising a transformer having primary and secondary windings, a plurality of electrodes connected to the secondary winding, means for connecting the primary winding to a source of alternating-current, and means for automatically changing the primary connections to vary the number of turns of the winding included in the primary circuit.

3. An electric-arc welding system comprising a transformer having primary and secondary windings, a plurality of electrodes connected to the secondary winding, means initially connecting a predetermined number of turns of the primary winding in a supply circuit, and means operable, upon the establishment of an arc, for inserting additional turns thereof.

4. An electric-arc welding system comprising a transformer having primary and secondary windings, a plurality of electrodes connected to the secondary winding, means initially connecting a predetermined number of turns of the primary winding in a supply circuit, means operable, upon the establishment of an arc, for inserting additional turns thereof, and means for maintaining closed-circuit conditions in the primary winding during the operation of inserting additional turns.

5. An electric-arc welding system comprising a transformer having primary and secondary windings, a plurality of electrodes connected to the secondary winding, a plurality of stationary contact-members connected to various turns of the primary winding, a movable contact-member adapted to engage the stationary members, means for causing the movable contact member to engage one of the stationary members when the primary winding is connected to a supply circuit and the secondary winding is short-circuited by engaging the electrodes, and means for causing the movable member to engage another of the stationary members when an arc is established between the electrodes.

6. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, means for moving the movable contact member into engagement with the second stationary contact member when the primary winding is connected to a supply circuit and the secondary winding is short-circuited by engaging the electrodes, and means for moving the movable contact member to engage the other stationary member when an arc is established between the electrodes.

7. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, means for moving the movable contact member into engagement with the second stationary contact member when the primary winding is connected to a supply circuit and the secondary winding is short-circuited by engaging the electrodes and means for moving the movable contact member to engage the other stationary member when an arc is established between the electrodes, said means including a coil connected in parallel relation to the electrodes.

8. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, a coil connected to the primary circuit to move the movable contact member into engagement with the second stationary contact member when the electrodes are engaged and means for moving the movable contact member to engage the other stationary member when an arc is established between the electrodes.

9. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, a coil connected to the primary circuit to move the movable contact member into engagement with the second stationary contact member when the electrodes are engaged and means for moving the movable contact member to engage the other stationary member when an arc is established between the electrodes, said means including a coil connected in parallel relation to the electrodes.

10. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, means for moving the movable contact member into engagement with the second stationary contact member when the primary winding is connected to a supply circuit and the electrodes are engaged, means for moving the movable contact member to engage the other stationary member when an arc is established between the electrodes and means for retarding the movement of the movable contact member.

11. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, a coil connected to the primary circuit to move the movable contact member into engagement with the second stationary contact member when the electrodes are engaged, means for moving the movable contact member to engage the other stationary member when an arc is established between the electrodes, said means including a coil connected in parallel relation to the electrodes and means for retarding the movement of the movable contact member.

12. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, means tending to maintain the movable contact member in engagement with the second stationary contact member and means for moving the movable contact member to engage the other stationary member.

13. An electric-arc welding system comprising a transformer having primary and secondary windings, a plurality of electrodes connected to the secondary winding, a stationary contact member connected to one end of the primary winding, a second stationary contact member connected to one of the primary turns between its ends, a movable contact member adapted to engage the stationary contact members, means tending to maintain the movable contact member in engagement with the second stationary contact member and means for moving the movable contact member to engage the other stationary member, said means including a plurality of coils, one of which is inductively related to the primary winding and controlled by a manually-operable switch that is normally open.

In testimony whereof I have hereunto subscribed my name this 2nd day of Sept., 1919.

OTTO H. ESCHHOLZ.